(12) United States Patent
Fujii et al.

(10) Patent No.: US 11,877,902 B2
(45) Date of Patent: Jan. 23, 2024

(54) REINFORCING-STRUCTURE SIMULTANEOUS-EMBEDDING-TYPE PLATE DENTURE AND METHOD OF FABRICATING THE SAME

(71) Applicant: KABUSHIKI KAISHA SHOFU, Kyoto (JP)

(72) Inventors: Kunihiro Fujii, Kyoto (JP); Hirokazu Sato, Kyoto (JP)

(73) Assignee: KABUSHIKI KAISHA SHOFU, Kyoto (JP)

( * ) Notice: Subject to any disclaimer, the term of this patent is extended or adjusted under 35 U.S.C. 154(b) by 216 days.

(21) Appl. No.: 17/374,134

(22) Filed: Jul. 13, 2021

(65) Prior Publication Data

US 2022/0031434 A1    Feb. 3, 2022

(30) Foreign Application Priority Data

Jul. 28, 2020 (JP) .................................. 2020-127412
Apr. 23, 2021 (JP) .................................. 2021-073358

(51) Int. Cl.
*A61C 13/103* (2006.01)
*A61C 13/01* (2006.01)

(52) U.S. Cl.
CPC .......... *A61C 13/1009* (2013.01); *A61C 13/01* (2013.01)

(58) Field of Classification Search
CPC . A61C 13/1009; A61C 13/10; A61C 13/1003; A61C 13/1026; A61C 13/0006
See application file for complete search history.

(56) References Cited

U.S. PATENT DOCUMENTS

| 2003/0162147 | A1 | 8/2003 | Dequeker | |
|---|---|---|---|---|
| 2007/0009852 | A1 | 1/2007 | Childress | |
| 2012/0258426 | A1* | 10/2012 | Boe | A61C 13/01 433/171 |
| 2015/0282906 | A1* | 10/2015 | Jacobson-Shagan | A61C 5/20 433/223 |
| 2017/0296311 | A1* | 10/2017 | Ueno | A61C 13/0006 |
| 2017/0367798 | A1* | 12/2017 | Sagolla | A61C 13/01 |
| 2018/0116771 | A1* | 5/2018 | Keating | A61C 13/20 |
| 2019/0175315 | A1* | 6/2019 | Faust | A61C 13/01 |
| 2019/0358004 | A1* | 11/2019 | Häfele | A61C 13/16 |

(Continued)

FOREIGN PATENT DOCUMENTS

| DE | 102007002178 A1 * | 7/2008 | ......... A61C 13/0004 |
|---|---|---|---|
| JP | 8-66413 | 3/1996 | |
| JP | 11-60425 | 3/1999 | |

(Continued)

OTHER PUBLICATIONS

Extended European Search Report dated Dec. 22, 2021 in corresponding European Patent Application No. 21187579.4.

*Primary Examiner* — Heidi M Eide
(74) *Attorney, Agent, or Firm* — Wenderoth, Lind & Ponack, L.L.P.

(57) ABSTRACT

A method of fabricating a plate denture, comprises: creating a denture plate having a concave socket formed thereon and a vertical groove formed on a bottom surface of the socket; applying an adhesive material to the socket and the vertical groove; embedding a reinforcing structure in the vertical groove to which the adhesive material is applied; and arranging an artificial tooth in the socket to which the adhesive material is applied.

22 Claims, 9 Drawing Sheets

(56) References Cited

U.S. PATENT DOCUMENTS

2022/0133449 A1* 5/2022 Herting ................ A61C 13/04
                                                          433/34

FOREIGN PATENT DOCUMENTS

| JP | 2010-187934 | 9/2010 |
| KR | 10-2027338 | 10/2019 |
| WO | 2016/052321 | 4/2016 |

* cited by examiner

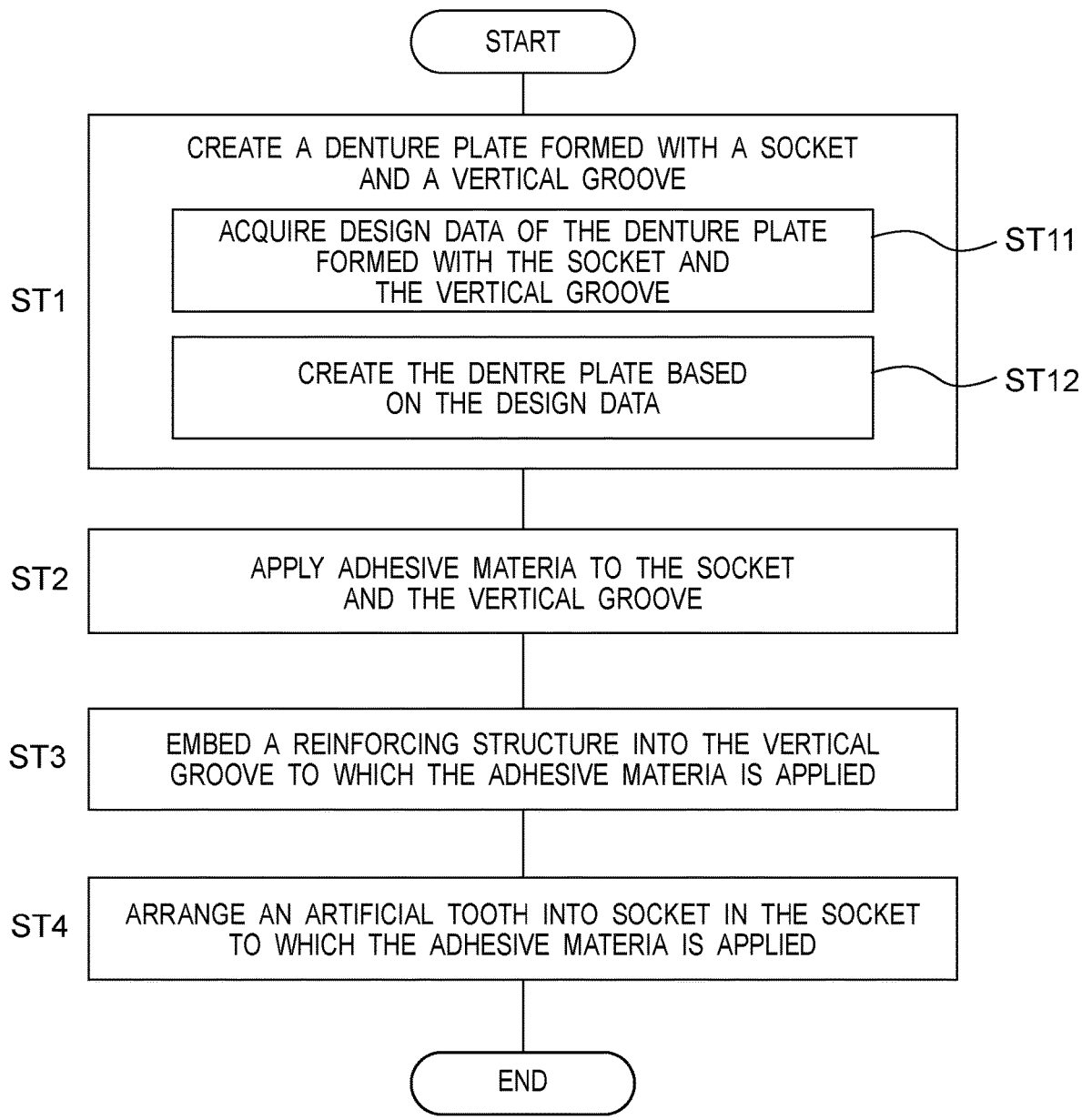

REINFORCING-STRUCTURE SIMULTANEOUS-EMBEDDING-TYPE PLATE DENTURE AND METHOD OF FABRICATING THE SAME

BACKGROUND OF THE INVENTION

1. Field of the Invention

The present invention relates to a reinforcing-structure simultaneous-embedding-type plate denture and a method of fabricating the same, and more particularly, to a denture fabrication method according to a computer aided design/manufacturing (CAD/CAM) method in the field of plate denture.

2. Description of the Related Art

Japanese Patent Application Laid-Open No. 8-66413 (JP H8-66413) discloses a plate denture that uses a reinforcing wire for dental use. The plate denture described in JP-A-8-66413 is formed by embedding in a resin bed the dental reinforcing wire with a flat section deformed to a predetermined shape and having an outer surface on which a concave portion and/or a convex portion is at least partly formed.

Japanese Patent Application Laid-Open No. 11-60425 (JP 11-60425) discloses a fiber-reinforced-resin plate denture in which a fibrous reinforcement wire is embedded as a reinforcing structure under an artificial dentition. The fiber-reinforced-resin plate denture described in JP-A-11-60425 includes a multiplicity of artificial teeth and a synthetic resin plate for fixedly arranging the artificial teeth, with the reinforcement fiber being embedded and integrated within the interior of the plate under the artificial teeth along the row of teeth.

International Publication WO2016/052321 discloses a method of fabricating a dental prosthesis. The fabrication method described in WO2016/052321 includes: a process of converting an intraoral shape into data; a process of designing, on data, a resin body as a shape of a portion formed by resin based on the data; a dental reinforcement material position design process of designing, on data, the position of the dental reinforcement material arranged inside the resin body; and a process of designing a resin body with an opening by forming, on data, based on a position where the dental reinforcement material is arranged with respect to the resin body, an opening leading to the space and exterior at the position.

SUMMARY OF THE INVENTION

An object to be achieved by the present invention is to provide a plate denture suppressing the deterioration in aesthetics while improving the strength.

The present invention achieving the above object will be described hereinbelow. For ease of understanding, here, reference numerals imparted in the specification and drawings are written in parentheses, but the present invention is not limited thereto.

A method of fabricating a plate denture according to an aspect of the present invention includes: creating a denture plate (3) having a concave socket (2) formed thereon and a vertical groove (7) formed on a bottom surface of the socket (2); applying an adhesive material (9) to the socket (2) and the vertical groove (7); embedding a reinforcing structure (8) in the vertical groove (7) to which the adhesive material (9) is applied; and arranging an artificial tooth (1) in the socket (2) to which the adhesive material (9) is applied.

A plate denture according to another aspect of the present invention includes: a denture plate (3) having a concave socket (2) formed thereon and a vertical groove (7) formed on a bottom surface of the socket (2); an adhesive material (9) applied to the socket (2) and the vertical groove (7); a reinforcing structure (8) arranged in the vertical groove (7) and embedded in the adhesive material (9); and an artificial tooth (1) arranged in the socket (2) and adhered by the adhesive material (9).

According to the present invention, it is possible to provide a plate denture suppressing the deterioration in aesthetics while improving the strength.

BRIEF DESCRIPTION OF THE DRAWINGS

FIG. 9 is an exemplary flowchart of the method of fabricating the plate denture.

Figure 1:
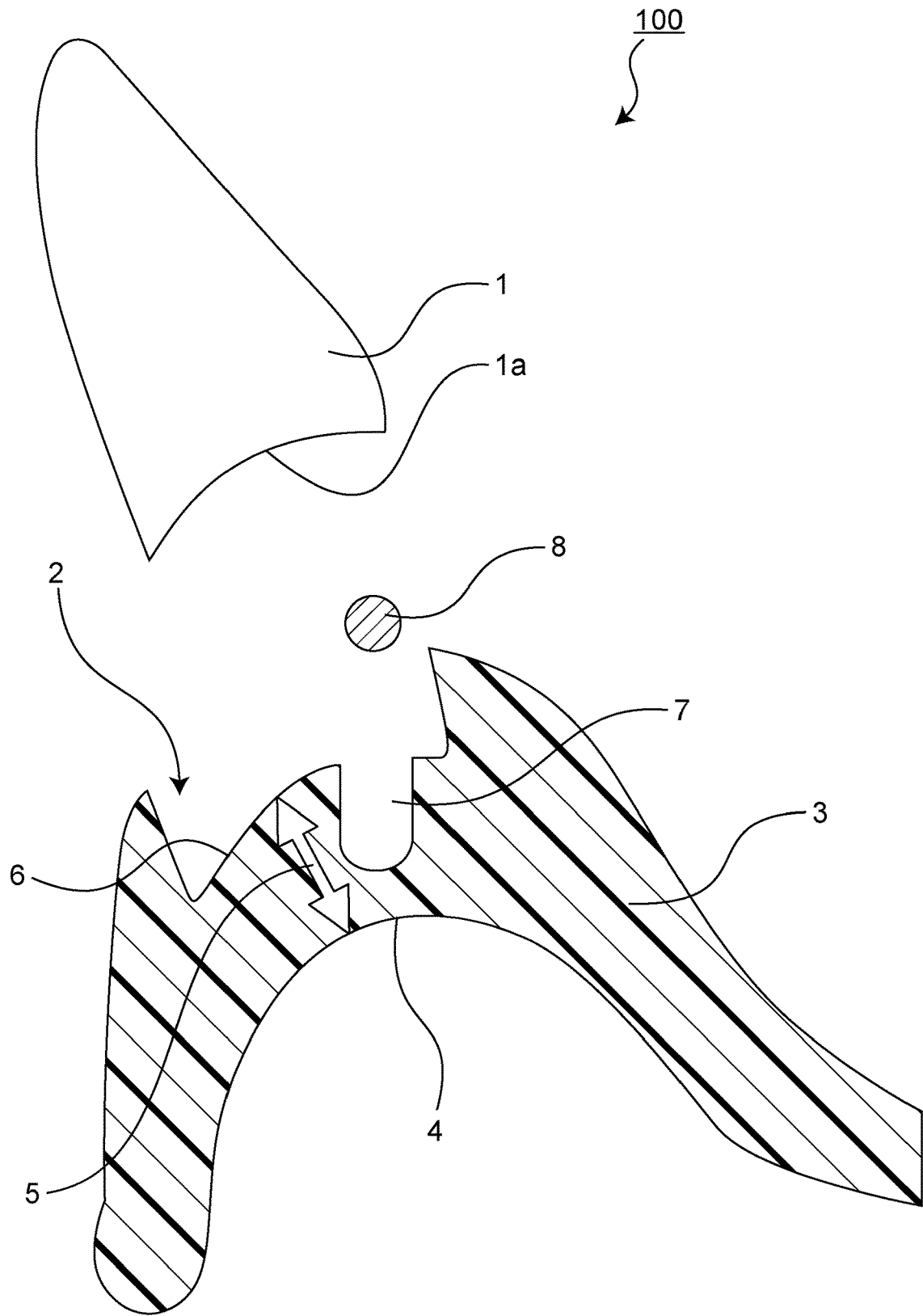
FIG. 1 is a sectional view, viewed from the lateral side, of members before completion of a reinforcing-structure simultaneous-embedding-type plate denture.

DESCRIPTION OF THE PREFERRED EMBODIMENTS (Background Leading to the Disclosure)

In the conventional plate denture fabrication method, a reinforcement wire made of metal, etc. is embedded in a place where the denture plate is easy to fracture. The procedure includes, after flasking and dewaxing, inserting a reinforcement wire onto a plaster model so that the reinforcement wire is embedded in the denture plate at a proper location and temporarily fixing it. However, when digging the denture plate resin after polymerization, the reinforcement wire inserted onto the plaster model protrudes toward the impression surface of the plate denture. For this reason, a very complicated work is forced such as cutting off the excess part of the reinforcement wire and doing finish polishing. Also, due to the filling pressure of the denture plate resin material, there are problems such as deformation of the reinforcement wire and displacement of the reinforcement wire from the set position. Furthermore, according to this method, the reinforcing structure is often placed at the central portion of the denture plate, causing aesthetic issues e.g. that the reinforcing structure reflects in black.

On the contrary, in recent years, a method is beginning to be put into practice use as the plate denture fabrication method, in which: a plate denture is designed on computer using CAD/CAM technology; a denture plate excluding an artificial teeth embedded portion (which is called "socket") is fabricated by cutting with an NC machine tool or laminate modeling with a 3D printer; and a ready-made artificial teeth are bound to the artificial teeth embedding portion of the denture plate using a dedicated adhesive material or a general-purpose dental acrylic resin.

Among methods of fabricating a plate denture by the CAD/CAM technology, a fabrication method using a 3D printer has been attracting attention in recent years. However, the denture plate fabricated with the 3D printer material may involve strength issues, as compared with the conventional plate denture fabricated with the acrylic resin material or plate denture fabricated by cutting a disc. Additionally, it has been pointed out that the denture plate fabricated with the 3D printer material has a weak binding force with a repair material represented by the general-purpose dental acrylic resin, whereupon embedding the reinforcing structure after completion of the plate denture may cause strength issues. Furthermore, the existing computer aided plate denture fabrication method does not include embedding the reinforcing structure in the denture plate and, in spite of the proposal of e.g. compensating for the strength by connecting teeth, has not been able to fully supplement the strength.

JP H8-66413 discloses a plate denture that uses a dental reinforcing wire. The denture disclosed in JP H8-66413 is a plate denture based on the above-described fabrication method, and recent computer aided plate denture fabrication methods cannot embed such a reinforcement wire into the denture plate in the process of fabrication.

JP H11-60425 discloses a denture in which a fibrous reinforcement wire is embedded as a reinforcing structure under an artificial dentition. Similarly to JP H8-66413, the denture disclosed in JP H11-60425 is based on the conventional method, and recent computer aided plate denture fabrication methods cannot embed such a reinforcement wire into the denture plate in the process of fabrication.

WO2016/052321 discloses a method of fabricating a dental prosthesis, the method including: a process of converting an intraoral shape into data; a process of designing, on data, a resin body as a shape of a portion formed by resin based on the data; a dental reinforcement material position design process of designing, on data, the position of the dental reinforcement material arranged inside the resin body; and a process of designing a resin body with an opening by forming, on data, based on a position where the dental reinforcement material is arranged with respect to the resin body, an opening leading to the space and exterior at the position. However, no specific mention is made of the position to arrange the reinforcing structure, the direction to open therefrom, and means of closing the opening. For example, in the case of a denture shown in FIG. 11 of WO2016/052321, the reinforcing structure 8 is arranged in the denture plate inside the artificial tooth implanting portion, and therefore the denture embraces an aesthetic issue such as affecting external appearance when the patient opens his/her mouth. In the case where the opening direction is toward the polished surface (front surface) of the denture, it is presumed that the opening is closed manually using room temperature curing resin, etc. from above the dental reinforcing material inserted into the denture plate. Due to the occurrence of excess resin part, however, there occur works such as the form correction and finish polishing. When the opening direction is toward the denture impression surface, it is difficult to accurately reproduce the mucosal shape through the form correction of the excess part, which induces denture incompatibility and pain, rendering it realistically impossible.

Thus, to solve the above problems, the inventors have found a configuration in which the reinforcing structure and the artificial teeth are simultaneously embedded, adhered, and integrated in the denture plate, and have reached the following invention.

A method of fabricating a plate denture of a first aspect of the present invention includes: creating a denture plate (3) having a concave socket (2) formed thereon and a vertical groove (7) formed on a bottom surface of the socket (2); applying an adhesive material (9) to the socket (2) and the vertical groove (7); embedding a reinforcing structure (8) in the vertical groove (7) to which the adhesive material (9) is applied; and arranging an artificial tooth (1) in the socket (2) to which the adhesive material (9) is applied.

Such a configuration enables the fabrication of the plate denture suppressing the deterioration in aesthetics while improving the strength. That is, the fracture resistance of the plate denture can be improved without impairing the aesthetics thereof. For example, in the method of fabricating a plate denture by a computer aided design/manufacturing (CAD/CAM) program, the reinforcing structure and the artificial teeth are simultaneously embedded, adhered, and integrated in the denture plate, whereby it becomes easy to fabricate the plate denture having a strength that can withstand impact and load generated during use and suppressing the degradation in aesthetics.

In the method of fabricating a plate denture of a second aspect of the present invention, the artificial tooth (1) may include at least six teeth of front teeth, i.e., left and right central incisors, lateral incisors, and canines; the vertical groove (7) and the reinforcing structure (8) may be formed in an arcuate shape along dentition; the vertical groove (7) and the reinforcing structure (8) may have a mesiodistal width (W1) of half or more of the mesiodistal width of molars (10); and the vertical groove (7) and the reinforcing structure (8) may have a lip-lingual or buccolingual width (W2) of 1.5 mm or more and 15.0 mm or less.

In the method of fabricating a plate denture of a third aspect of the present invention, the plate denture may be a partial plate denture; and the reinforcing structure (8) may include a minor connector (11) connected to a retainer (14) retaining the plate denture.

In the method of fabricating a plate denture of a fourth aspect of the present invention, the embedding the reinforcing structure (8) may include arranging at least part of the reinforcing structure (8) at a position apart 0.001 mm or more and 1.0 mm or less from an inner wall (7a) defining the vertical groove (7).

In the method of fabricating a plate denture of a fifth aspect of the present invention, the creating a denture plate (3) may include: acquiring design data of the denture plate (3) having the socket (2) and the vertical groove (7) formed thereon; and creating the denture plate (3), based on the design data.

A plate denture of a sixth aspect of the present invention includes: a denture plate (3) having a concave socket (2) formed thereon and a vertical groove (7) formed on a bottom surface of the socket (2); an adhesive material (9) applied to the socket (2) and the vertical groove (7); a reinforcing structure (8) arranged in the vertical groove (7) and embedded in the adhesive material (9); and an artificial tooth (1) arranged in the socket (2) and adhered by the adhesive material (9).

Such a configuration enables the provision of a plate denture suppressing the deterioration in aesthetics while improving the strength.

In the plate denture of a seventh aspect of the present invention, the artificial tooth (1) may include at least six teeth of front teeth, i.e., left and right central incisors, lateral incisors, and canines; the vertical groove (7) and the reinforcing structure (8) may be formed in an arcuate shape along dentition; the vertical groove (7) and the reinforcing structure (8) may have a mesiodistal width (W1) of half or more of the mesiodistal width of molars (10); and the vertical groove (7) and the reinforcing structure (8) may have a lip-lingual or buccolingual width (W2) of 1.5 mm or more and 15.0 mm or less.

In the plate denture of an eighth aspect of the present invention, the plate denture may be a partial plate denture; and the reinforcing structure (8) may include a minor connector (11) connected to a retainer (14) retaining the plate denture.

In the plate denture of a ninth aspect of the present invention, at least part of the reinforcing structure (8) may be apart 0.001 mm or more and 1.0 mm or less from an inner wall (7a) defining the vertical groove (7); and the adhesive material 9 may be applied to a space between at least part of the reinforcing structure (8) and the inner wall (7a) defining the vertical groove (7).

In the plate denture of a tenth aspect of the present invention, the vertical groove (7) may have on its inner wall (7a) a protrusion (13), the protrusion (13) being in contact with the reinforcing structure (8).

The present invention will now be described in detail with reference to the drawings.

FIG. 1 shows a section, viewed from the lateral side, of members before completion of a reinforcing-structure simultaneous-embedding-type plate denture 100. The reinforcing-structure simultaneous-embedding-type plate denture 100 comprises three members i.e. an artificial tooth 1, a denture plate 3, and a reinforcing structure 8. In this specification, the reinforcing-structure simultaneous-embedding-type plate denture 100 may be referred to as "plate denture 100". The plate denture 100 may be a partial plate denture or may be a complete plate denture.

The form, material, and fabrication means of the artificial tooth 1 are not particularly limitative, but those in accordance with publicly-known techniques may be used. For example, use may be made of a ready-made acrylic resin artificial tooth mass-produced by mold or of an artificial tooth designed, cut, or laminate-modelled into shapes meeting individual patient needs, using dental CAD/CAM technology. The form of the artificial tooth may be a single tooth as a separately independent tooth or may be two or more teeth coupled together. For example, the artificial tooth 1 comprises at least one of a central incisor, a lateral incisor, a canine, a first premolar, a second premolar, a first molar, and a second molar.

The denture plate 3 is a base on which the artificial tooth 1 is arranged. The denture plate 3 is formed with a socket 2 in which the artificial tooth 1 is embedded. Furthermore, for embedding of reinforcing structure 8, the denture plate 3 is disposed with a vertical groove 7 that opens in a rib shape from an intermediate portion 5 between an impression surface 4 and a basal surface 6 of the denture plate 3 toward the implanting direction of the artificial tooth 1. The material of the denture plate 3 is not particularly limited but may be one in accordance with publicly-known techniques such as e.g. polymethyl methacrylate (PMMA), polycarbonate (PC), and polyamide (PA).

The socket 2 is a concavely depressed portion on a surface of the denture plate 3. A base 1a of the artificial tooth 1 is inserted into the socket 2. The base 1a of the artificial tooth 1 is a tooth root portion of the artificial tooth 1 and is a portion adhered to the denture plate 3. The socket 2 is formed concavely so as to fit the outer shape of the base 1a of the artificial tooth 1. That is, the socket 2 is formed in a concavely depressed manner enclosing at least part of the base 1a of the artificial tooth 1. The socket 2 is formed arcuately along the direction of arrangement of the artificial tooth 1. The artificial tooth 1 is adhered fixedly to the socket 2 by an adhesive material 9 that will be described later.

The impression surface 4 is a surface of the denture plate 3 in contact with a mucous membrane in an oral cavity. The basal surface 6 is a surface of the denture plate 3 opposite to the impression surface 4 and is a surface on which the artificial tooth 1 is arranged. The basal surface 6 is a bottom surface of the socket 2. The intermediate portion 5 is a portion between the impression surface 4 and the basal surface 6 of the denture plate 3.

The vertical groove 7 is a groove disposed on the bottom surface of the socket 2, i.e. on the basal surface 6. The vertical groove 7 is a groove depressed from the basal surface 6 toward the impression surface 4 and is disposed in the intermediate portion 5. In the section of the artificial tooth 1 viewed from the lateral side, the bottom surface of the vertical groove 7 is curved in an arc. Although the dimensions of the vertical groove 7 can be set to any values within the range of buccolingual width of the socket 2 and within the range of depth from the basal surface 6 to the impression surface 4, the lip-lingual or buccolingual width is 1.5 mm or more and 15.0 mm or less, preferably 2.0 mm or more and 12.0 mm or less, considering the dimensions of the traditional general artificial tooth and the arrangement position thereof in the denture plate. The depth is 0.5 mm or more and 10.0 mm or less, preferably 0.6 mm or more and 9.0 mm or less.

Figure 2:
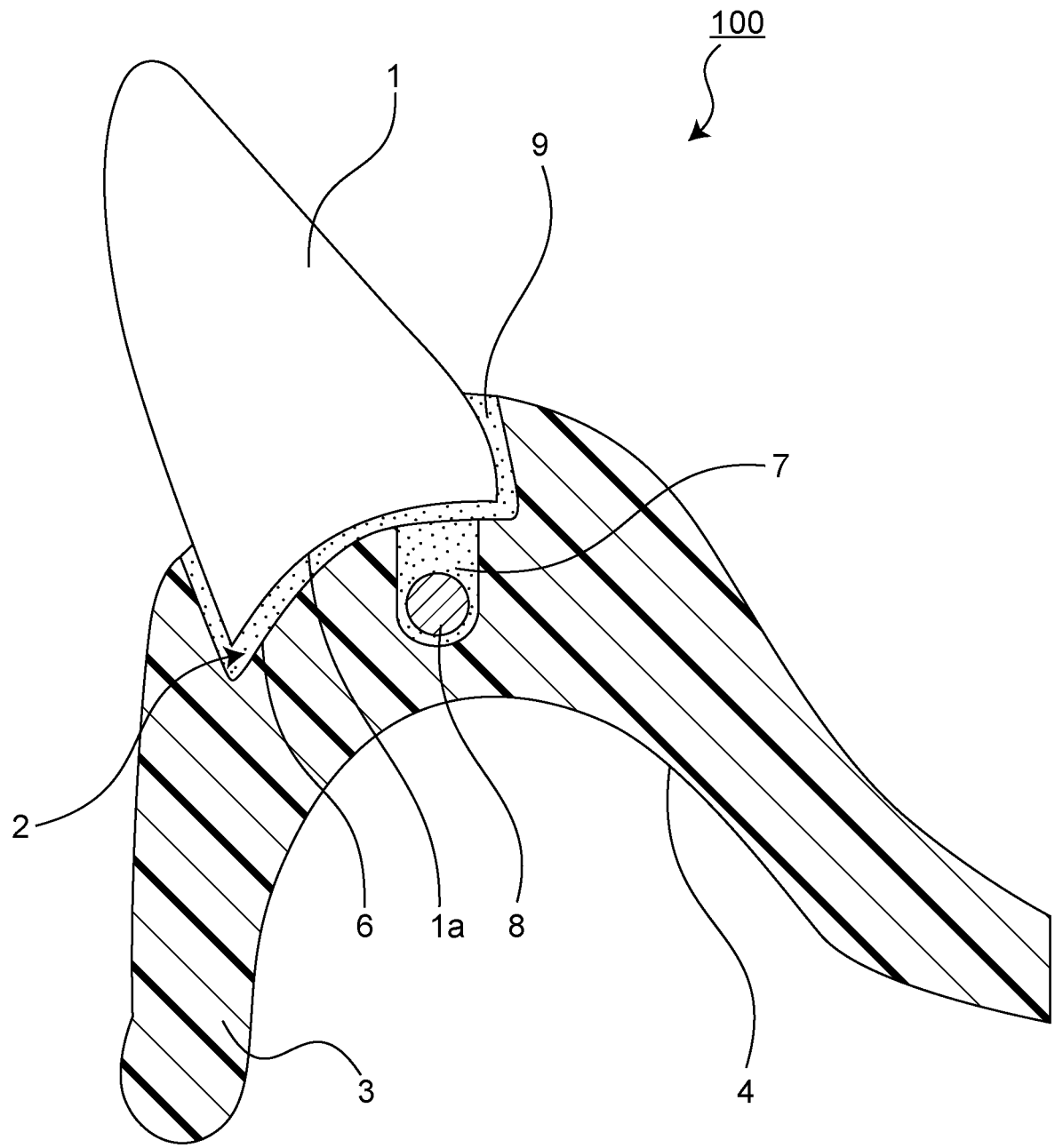
FIG. 2 is a sectional view of the members after completion of the reinforcing-structure simultaneous-embedding-type plate denture, viewed from the lateral side of mandibular front teeth.

FIG. 2 shows a section of the members after completion of the reinforcing-structure simultaneous-embedding-type plate denture 100, viewed from the lateral side of mandibular front teeth. That is, FIG. 2 shows the state where after applying the adhesive material 9 into the socket 2 and the vertical groove 7 of an arcuate shape along the dentition, the reinforcing structure 8 is embedded in the vertical groove 7 and then the artificial tooth 1 is embedded thereon to be adhered together.

The reinforcing structure 8 is arranged in the vertical groove 7. Specifically, the reinforcing structure 8 is arranged in the vertical groove 7 and embedded in the adhesive material 9. In other words, the reinforcing structure 8 is arranged in the adhesive material 9 applied in the vertical groove 7. The reinforcing structure 8 is e.g. a wire having a circular section. The reinforcing structure 8 is not limited thereto but it may be a wire that is rectangular, elliptical, or polygonal in section. The reinforcing structure 8 is not limited to the wire. For example, the reinforcing structure 8 may be a plate member that is rectangular, elliptical, or polygon in section.

The reinforcing structure 8 is a structure that reinforces the denture plate 3. The reinforcing structure 8 is formed of a material having a modulus of elasticity and a toughness higher than those of the material forming the denture plate 3. As for the material of the reinforcing structure 8, known ones are available such as e.g. metal and glass fiber composite resin. For example, if metal, use may be made of commercially available denture plate reinforcing wire, metal wire for wire clasp, or arch wire for orthodontics, or instead, for example, resin material reinforced with glass fiber is also available. The dimensions of the reinforcing structure 8 can also be set to any values within the range of buccolingual width of the socket 2 and within the range of depth from the basal surface 6 to the impression surface 4. Considering the dimensions of the traditional general artificial tooth and the arrangement position thereof in the denture plate, the lip-lingual or buccolingual width is 1.5 mm or more and 15.0 mm or less, preferably 2.0 mm or more and 12.0 mm or less, with the depth being 0.5 mm or more and 10.0 mm or less, preferably 0.6 mm or more and 9.0 mm or less. To apply the adhesive material 9 between the vertical groove 7 and the reinforcing structure 8, it is desirable to thin (offset) by a certain thickness with respect to the shape and dimensions of the vertical groove 7. The proper amount of offset is 0.001 mm or more and 1.0 mm or less.

By embedding the reinforcing structure 8 and then embedding the artificial tooth 1 thereon after application of the adhesive material 9 into the socket 2 and the vertical groove 7 of an arcuate shape along the dentition, it becomes possible to achieve adhesion of the artificial tooth 1 and integration of the reinforcing structure 8 and the denture plate 3. Available as the adhesive material 9 after embedding the reinforcing structure 8 is e.g. acrylic room temperature curing resin, or liquid material thereof in the case of modeling the denture plate 3 with a 3D printer etc. In the case where, such as when the material of the reinforcing structure 8 is metal, the adhesiveness with the denture plate material is poor, metal primer etc. may be used together depending on the material so that the adhesiveness between the denture plate 3 and the reinforcing structure 8 can be secured more firmly. The metal primer may be e.g. publicly-known ones. In the case where the adhesive material 9 applied is the acrylic room temperature curing resin, the adhesive material 9 cures by being left for a predetermined time. When the adhesive material 9 applied is the liquid material used by the 3D printer etc., it is cured by light emitted from a light irradiation device or the like.

In this manner, the plate denture 100 in the example of FIGS. 1 and 2 comprises the denture plate 3, the adhesive material 9, the reinforcing structure 8, and the artificial tooth 1. The denture plate 3 is formed with the concave socket 2. The bottom surface (basal surface 6) of the socket 2 is formed with the vertical groove 7. The adhesive material 9 is arranged in the socket 2 and in the vertical groove 7. The reinforcing structure 8 is arranged in the vertical groove 7 and embedded in the adhesive material 9. The artificial tooth 1 is arranged in the socket 2 and is adhered by the adhesive material 9.

The above plate denture 100 is an example and the present disclosure is not limited to this mode.

Figure 3:
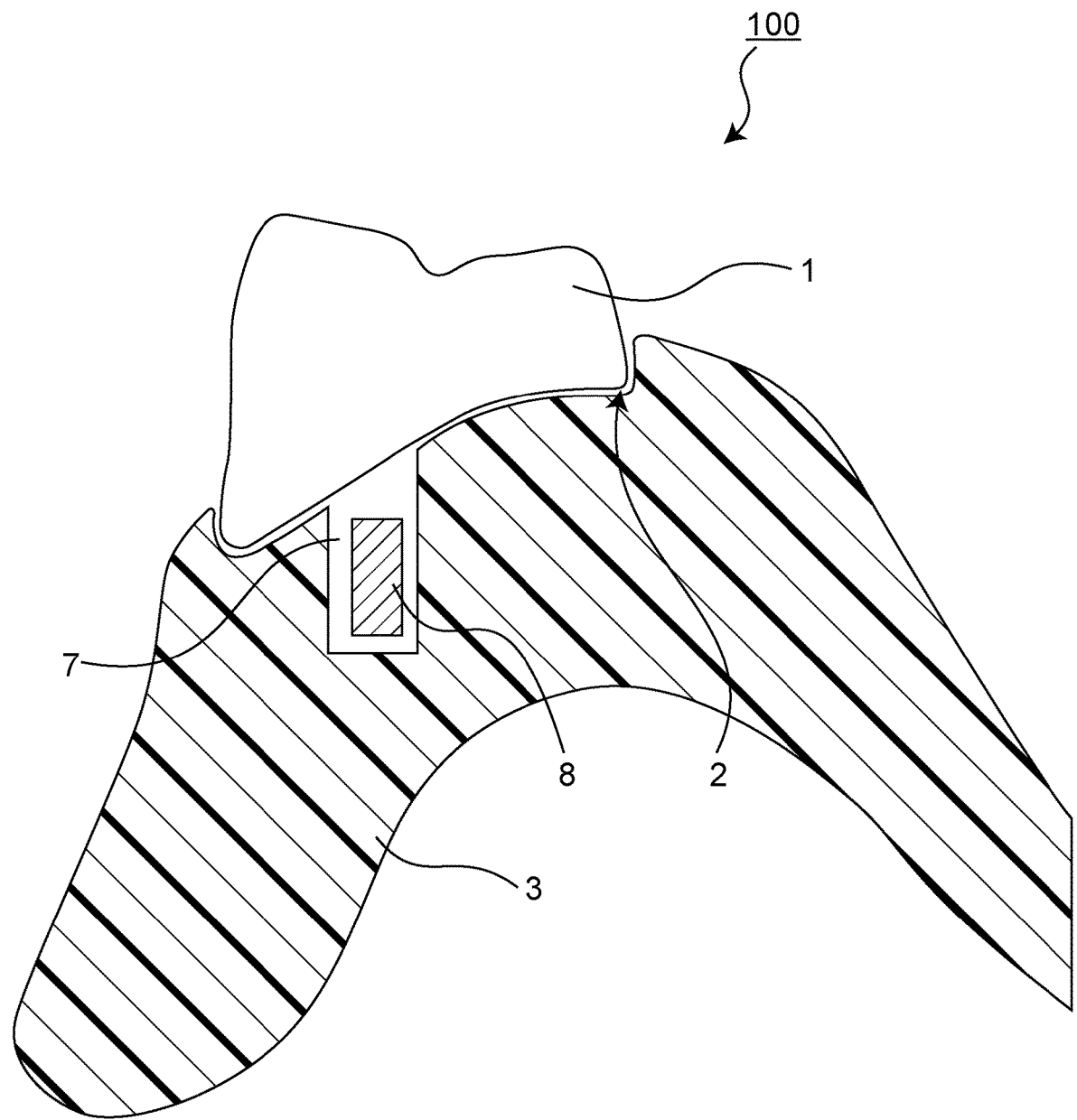
FIG. 3 is a sectional view of another example of the reinforcing-structure simultaneous-embedding-type plate denture.

FIG. 3 shows an example of the reinforcing-structure simultaneous-embedding-type plate denture 100 in the state where a reinforcing core of a dental stainless alloy is used as the reinforcing structure 8. In FIG. 3, the adhesive material 9 is not shown for ease of explanation. In the example shown in FIG. 3, the reinforcing structure 8 is made of a dental stainless alloy having a plate shape with a rectangular section. By cutting a ready-made reinforcing core to a required dimension and using it through a process such as bending, the reinforcing-structure simultaneous-embedding-type plate denture 100 can simply be fabricated without need to design and fabricate the reinforcing structure 8.

The shape of the reinforcing structure 8 is also not particularly limited as long as it lies within the range of the intermediate portion 5 of the denture plate 3 joining the socket 2 and the impression surface 4, but use may be made of ones manufactured with pre-standardized dimensions and shapes or ones designed and cast, cut, or laminate-modelled to any shape and thickness.

Figure 4:
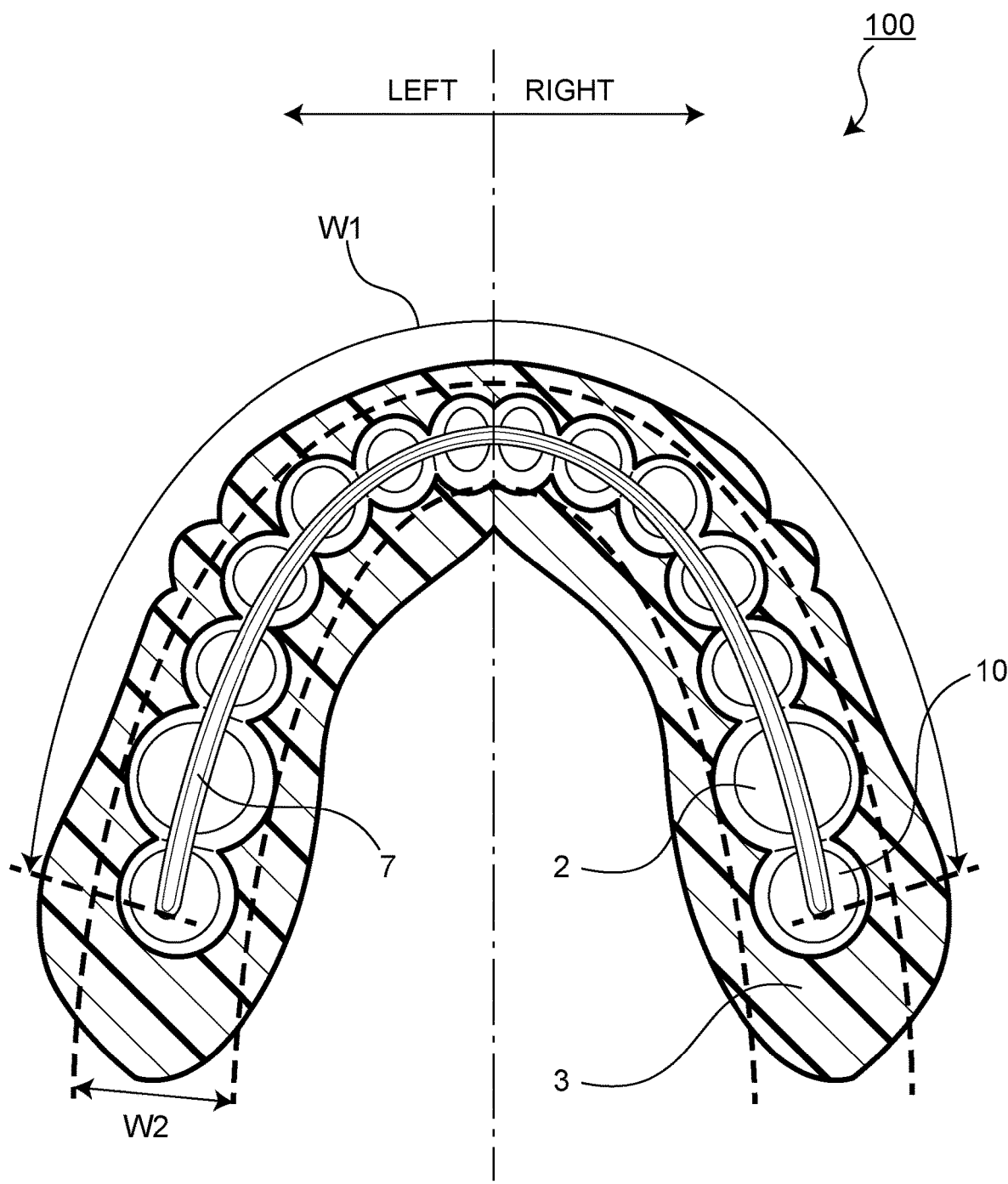
FIG. 4 is a top view of a denture plate of the another example before embedding a reinforcing structure and artificial tooth therein.

FIG. 4 shows a top plan of the denture plate 3 of another example of the plate denture 100 before embedding the reinforcing structure 8 and the artificial tooth 1 therein. In the example shown in FIG. 4, the vertical groove 7 is disposed in an arcuate shape along the dentition, i.e. in a U shape, in plan view, i.e. when viewed from the direction from the basal surface 6 of the denture plate 3 toward the impression surface 4 thereof. A mesiodistal width W1 of the vertical groove 7 includes at least six teeth of the front teeth, i.e., left and right central incisors, lateral incisors, and canines and further extends to a length of half or more of the mesiodistal width of last molars 10. Furthermore, a lip-lingual or buccolingual width W2 of the vertical groove 7 is 1.5 mm or more and 15.0 mm or less, preferably 2.0 mm or more and 12.0 mm or less. The reinforcing structure 8 is arranged in the vertical groove 7. For this reason, a mesiodistal width W1 of the reinforcing structure 8 includes at least six teeth of the front teeth, i.e., left and right central incisors, lateral incisors, and canines and further extends to a length of half or more of the mesiodistal width of last molars 10. Furthermore, a lip-lingual or buccolingual width W2 of the reinforcing structure 8 is 1.5 mm or more and 15.0 mm or less, preferably 2.0 mm or more and 12.0 mm or less. As used herein, the mesiodistal width W1 means a distance between two points vertical to crown axes and maximizing the distance between mesial and distal planes. The lip-lingual or buccolingual width W2 means a distance between two points vertical to crown axes and maximizing the distance between an anterior labial surface or a molar buccal surface and a lingual surface. The last molars refer to molars at the end of the dentition arch and, in the case of the ordinary full-plate denture, refer to the second molars. However, since the case is also considered where the first molars become end parts of the dentition arch due to no arrangement spaces for the second molars in the plate denture or where the premolars become end parts of the dentition arch in the partial plate denture, the last molars 10 in the description of the present invention refer to rearmost molars of the artificial tooth 1 implanted in the denture plate 3. That is, the last molars 10 are any of the first premolars, the second premolars, the first molars, and the second molars.

By allowing the mesiodistal width W1 of the reinforcing structure 8 to include up to the last molars 10 and further by limiting the lip-lingual or buccolingual width W2, the fracture resistance of the plate denture 100 can be improved.

Figure 5:
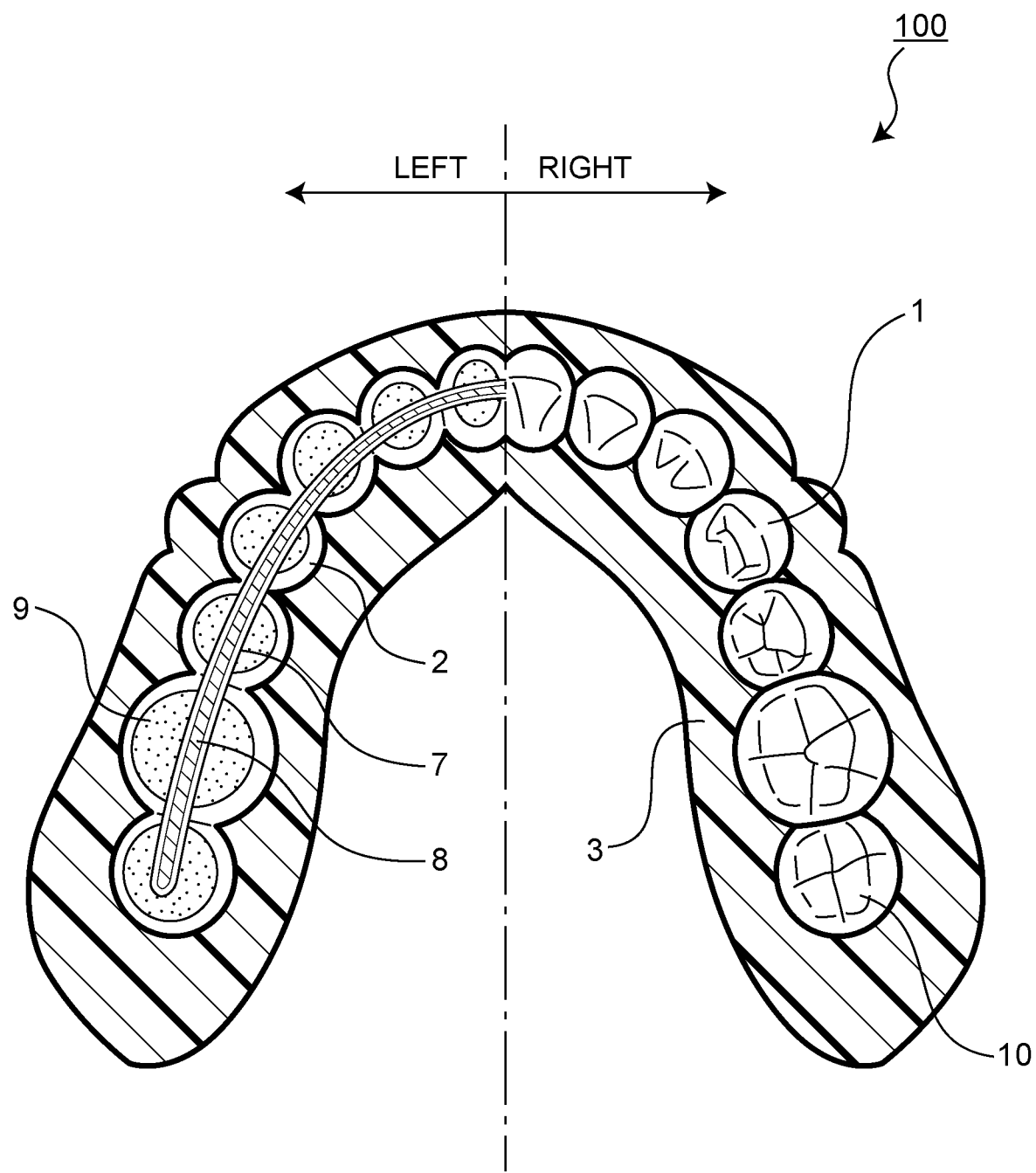
FIG. 5 is a top view of a reinforcing structure and artificial tooth embedded and adhered in the denture plate of FIG. 4.

FIG. 5 shows the reinforcing structure 8 and the artificial tooth 1 embedded in the denture plate 3 of the top view of FIG. 4. To explain the construction clearly, the left side of the diagram shows the reinforcing structure 8 embedded, while the right side of the diagram shows the artificial tooth 1 finally embedded on the embedded reinforcing structure 8. In embedding the reinforcing structure 8 in the denture plate 3, the adhesive material 9 is applied in advance to the inner surfaces of the socket 2 and of the vertical groove 7 of an arcuate shape along the dentition. The reinforcing structure 8 is then embedded as shown in the left side of the plate denture 100 and then the artificial tooth 1 is embedded as shown in the right side of the plate denture 100. The adhesive material 9 may additionally be applied as necessary before embedding the artificial tooth 1 after embedding the reinforcing structure 8. By curing the adhesive material 9 after embedding the artificial tooth 1, it becomes possible to achieve adhesion between the artificial tooth 1 and the denture plate 3 and integration of the reinforcing structure 8 and the denture plate 3. Furthermore, by keeping the embedding position of the reinforcing structure 8 within the range of the socket 2 for the artificial tooth 1, the reinforcing structure 8 cannot interfere with the exterior of the plate denture 100, making it possible to eliminate the above aesthetic issues.

In this manner, in the example shown in FIGS. 4 and 5, the artificial tooth 1 includes at least six teeth of the front teeth, i.e., left and right central incisors, lateral incisors, and canines. The vertical groove 7 is formed into an arcuate shape along the dentition. The mesiodistal width W1 of the reinforcing structure 8 is half or more of the mesiodistal width of the molars 10. The lip-lingual or buccolingual width W2 of the reinforcing structure 8 is 1.5 mm or more and 15.0 mm or less.

Figure 6:
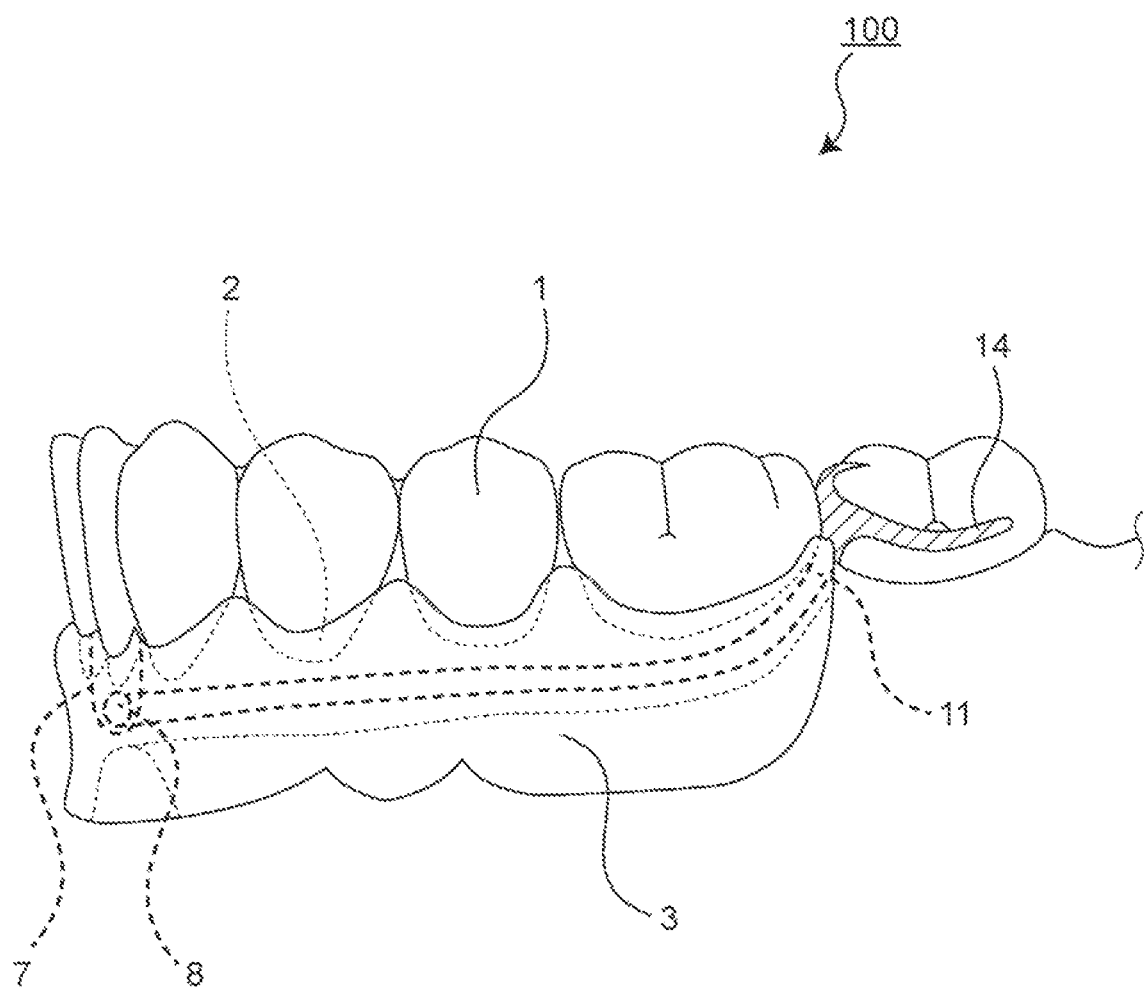
FIG. 6 is a side view of the reinforcing-structure simultaneous-embedding-type plate denture of the another example.

FIG. 6 shows a lateral side of the plate denture 100 of the another example. In the example shown in FIG. 6, the plate denture 100 is a partial plate denture and includes a minor connector 11 at the end of the reinforcing structure 8. The minor connector 11 refers generally to a structure connecting together the denture plate 3 or a major connector of the partial plate denture such as a lingual bar, a palatal bar, etc. and a retainer 14 of the partial plate denture such as a clasp and a rest. In the example shown in FIG. 6, the vertical groove 7 passes through the lateral surface of the denture plate 3 in the direction of arrangement of the artificial tooth 1. This allows the end of the reinforcing structure 8 to be exposed from the lateral surface of the denture plate 3. The minor connector 11 is disposed at the end of the reinforcing structure 8 and is exposed from the denture plate 3.

The end shape of the minor connector 11 is not particularly limited, but a publicly-known retainer may be disposed, or, as shown in the diagram, the shape from the reinforcing structure 8 up to the clasp and rest may integrally be fabricated. By including the minor connector 11, it becomes possible to integrate the reinforcing structure 8 and the retainer 14, rendering the reinforcing structure more solid so that the denture can be prevented from fracturing due to distortion of the retainer 14.

In this manner, in the example of FIG. 6, the plate denture 100 is a partial plate denture, with its reinforcing structure 8 having the minor connector 11 connected to the retainer 14 that retains the plate denture 100.

Figure 7:
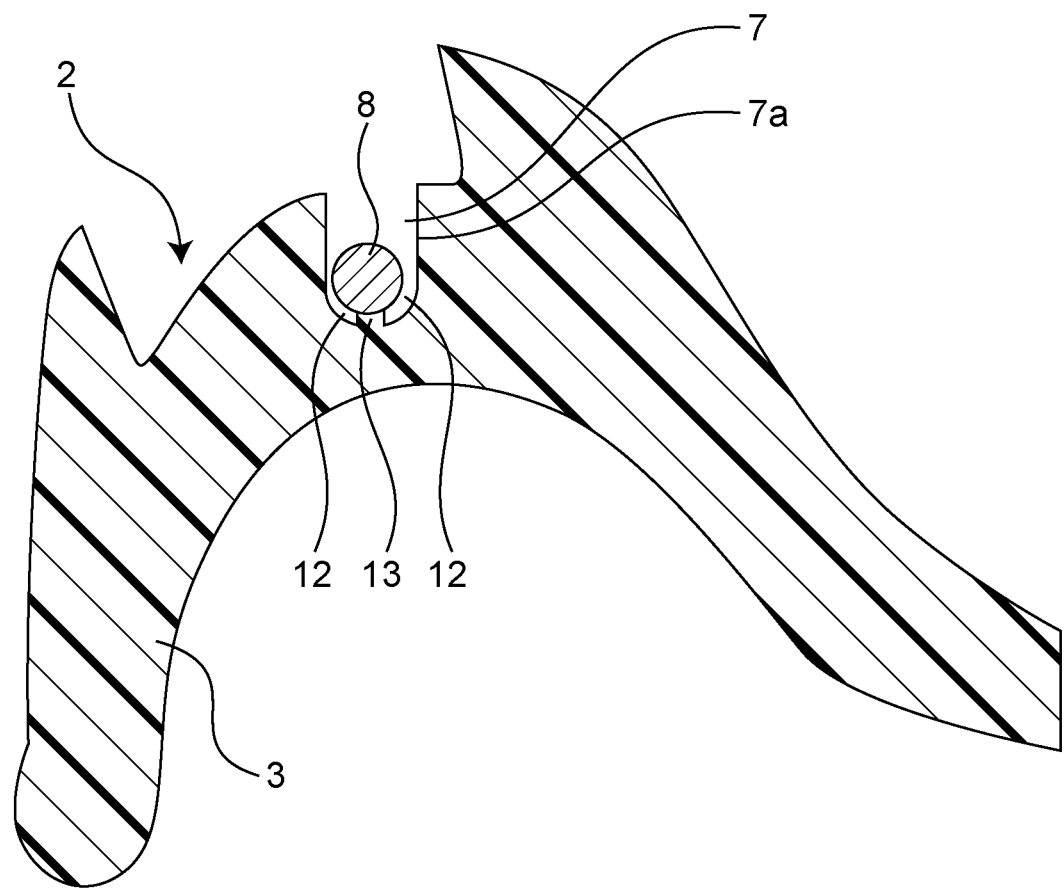
FIG. 7 is a sectional view, viewed from the lateral side, of the denture plate of the another example with the reinforcing structure being embedded therein.

FIG. 7 shows a section, viewed from the lateral side, of the denture plate 3 of the another example with the reinforcing structure 8 being embedded therein. In FIG. 7, the adhesive material 9 is not shown. In the example of FIG. 7, after determining the shape of the reinforcing structure 8 and the embedding position thereof in the denture plate 3, a rib-shaped opening is disposed toward the implanting direction of the artificial tooth 1, to form the vertical groove 7 of an arcuate shape along the dentition. At this time, the vertical groove 7 arched along the dentition may be of an offset shape having an appropriate gap 12 partially or entirely depending on the manufacturing tolerances of both the reinforcing structure 8 to be embedded in and the denture plate 3. For example, the dimension of the gap 12 is 0.001 mm or more and 1.0 mm or less, preferably 0.01 mm or more and 0.1 mm or less. The dimension of the gap 12 is a distance between the reinforcing structure 8 and an inner wall 7a defining the vertical groove 7, when the denture plate 3 is viewed from its lateral side. This allows a space for applying the adhesive material 9 to be secured between the reinforcing structure 8 and the vertical groove 7 of an arcuate shape along the dentition.

Although this gap 12 may basically be set to have an even thickness with respect to the reinforcing structure 8, contact with the reinforcing structure 8 may be made without partly disposing the gap 12, or the gap 12 with a dimension narrower than the periphery may be disposed, as shown in FIG. 7. This achieves an improvement in accuracy of the embedding position of the reinforcing structure 8 with respect to the vertical groove 7 arched along the dentition, thereby making it possible to suppress the generation of stress and the deformation of the denture plate 3 due to curing shrinkage of the adhesive material 9.

To describe in detail, in the example of FIG. 7, the reinforcing structure 8 is apart from the inner wall 7a defining the vertical groove 7. The inner wall 7a includes a bottom surface and a side wall of the vertical groove 7. The adhesive material 9 is arranged between the reinforcing structure 8 and the inner wall 7a. That is, the reinforcing structure 8 is buried in the adhesive material 9 and is apart from the inner wall 7a defining the vertical groove 7. The distance between the reinforcing structure 8 and the inner wall 7a is 0.001 mm or more and 1.0 mm or less, preferably 0.01 mm or more and 0.1 mm or less. In other words, the thickness of the adhesive material 9 arranged between the reinforcing structure 8 and the inner wall 7a is 0.001 mm or more and 1.0 mm or less, preferably 0.01 mm or more and 0.1 mm or less.

In this manner, in the example of FIG. 7, at least part of the reinforcing structure 8 is apart 0.001 mm or more and 1.0 mm or less from the inner wall 7a defining the vertical groove 7. The adhesive material 9 is applied between the at least part of the reinforcing structure 8 and the inner wall 7a defining the vertical groove 7. In consequence, the reinforcing structure 8 can firmly be fixed to the denture plate 3 by the adhesive material 9. "At least part of the reinforcing structure 8" means that it may refer to the whole of the reinforcing structure 8 or may refer to part thereof. In the example of FIG. 7, part of the reinforcing structure 8 is arranged apart from the side wall defining the vertical groove 7, with the adhesive material 9 applied between the part of the reinforcing structure 8 and the side wall of the vertical groove 7. The other part of the reinforcing structure 8 is in contact with the bottom surface of the vertical groove 7, with no adhesive material 9 applied thereto.

In the example shown in FIG. 7, a protrusion 13 is disposed on the inner wall 7a of the vertical groove 7. Part of the reinforcing structure 8 may be in contact with the protrusion 13 disposed on the inner wall 7a of the vertical groove 7. Specifically, the protrusion 13 is disposed on the bottom surface of the vertical groove 7. The protrusion 13 is substantially rectangular in section when viewed from the lateral side. The protrusion 13 protrudes from the bottom surface of the vertical groove 7 by 0.001 mm or more and 1.0 mm or less. Preferably, the protrusion 13 protrudes therefrom by 0.01 mm or more and 0.1 mm or less. The protrusion 13 has a width dimension smaller than that of the reinforcing structure 8, when viewed from the lateral side. The protrusion 13 may have a top surface concaved in section, when viewed from the lateral side. The protrusion 13 is disposed in an arcuate shape i.e. in a U shape along the dentition, in plan view i.e. when viewed from the direction from the basal surface 6 toward the impression surface 4 of the denture plate 3. The protrusion 13 may be a single continuous protrusion or may be a plurality of protrusions arranged side by side. The reinforcing structure 8 is arranged on the top surface of the protrusion 13.

Although the example has been described where the protrusion 13 is disposed on the bottom surface of the vertical groove 7, this is not limitative. The protrusion 13 may be disposed e.g. on the side wall defining the vertical groove 7. For example, the protrusion 13 may be disposed on each of two facing side walls defining the vertical groove 7. Thus, by disposing the protrusion 13 on the inner wall 7*a* defining the vertical groove 7, it becomes possible to heighten the accuracy of the embedding position of the reinforcing structure 8. It also becomes possible to suppress the generation of stress and the deformation of the denture plate 3 due to curing shrinkage of the adhesive material 9.

In this manner, in the example of FIG. 7, the protrusion 13 is disposed on the inner wall 7*a* of the vertical groove 7. The protrusion 13 is in contact with the reinforcing structure 8. Note however that the protrusion 13 is not an essential constituent element. The protrusion 13 may be formed from a separate member from the bottom surface of the vertical groove 7.

Figure 8:
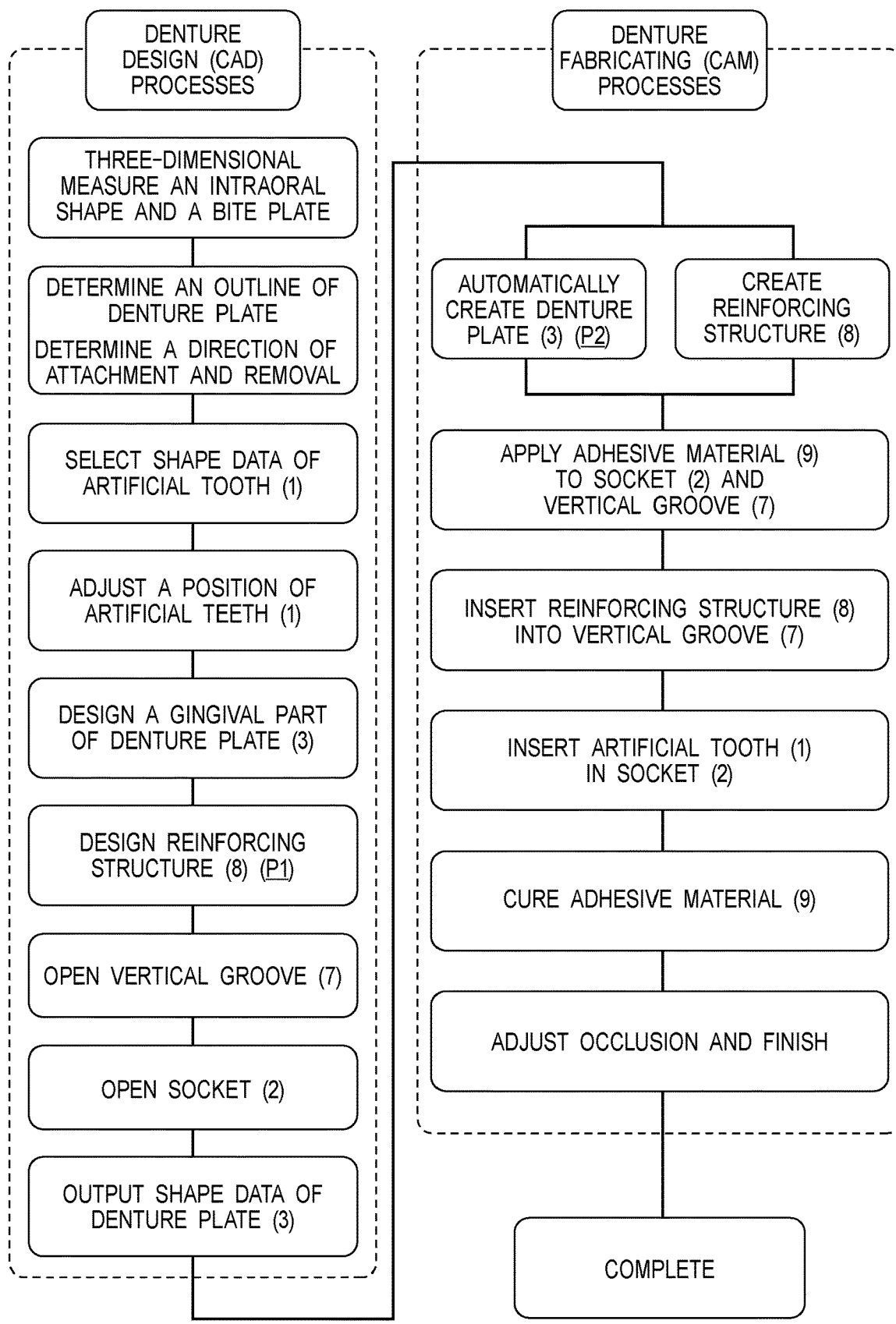
FIG. 8 is a flowchart of a method of fabricating the reinforcing-structure simultaneous-embedding-type plate denture by a computer aided design/manufacturing (CAD/CAM) program.

FIG. 8 shows, as a flowchart, processes of designing the plate denture 100 by a computer aided design/manufacturing (CAD/CAM) program. In the example shown in FIG. 8, the design (CAD) processes of the plate denture 100 include processes of designing (P1) the reinforcing structure 8 and of opening the vertical groove 7 arched along the dentition, in addition to processes from three-dimensional measuring of an intraoral shape and a bite plate up to designing of a gingival part of the denture plate 3.

The design of the reinforcing structure 8 is as described above. That is, since a space allowing the design of the reinforcing structure 8 described above is determined by maxillary and mandibular impression surface data obtained by the three-dimensional measuring of the patient's intraoral shape and by position determination by the arrangement process of the artificial tooth 1, any reinforcing structure 8 and vertical groove 7 arched along the dentition may be designed and further, if necessary, any dimensions and shape may be employed. At the stage of designing P1 of this reinforcing structure 8, selection is made whether to use a ready-made reinforcing core, etc. or to fabricate a custom-made reinforcing structure 8 depending on the denture plate form of an individual case.

In the case of using a ready-made, information such as shape and dimensions is registered in advance as database, which is used to determine the arcuate shape along the dentition to be curved and the embedding positon. In the case of fabricating a custom-made reinforcing structure 8 depending on the denture plate form of an individual case, a selection is appropriately made of a method of using a 3D printer to laminate-model the shape of the reinforcing structure 8, which is invested in a dental investing material to cast a dental alloy or of a method of grinding a dental resin disc strengthened with glass fiber.

Next, as for opening the vertical groove 7 of an arcuate shape along the dentition, the shape of the denture plate 3 allowing embedding of the reinforcing structure 8 can be designed by grinding and removing, from the gingival part of a polished surface of the designed denture plate 3, a shape obtained by extending a shape model or its offset shape model of the reinforcing structure 8 in the direction of implantation of the artificial tooth 1. Opening the socket 2 can be performed with a publicly-known technique, i.e. by grinding and removing the shape of the artificial tooth 1 from the gingival part of the polished surface of the designed denture plate 3. The priority order is not particularly limited between the process of opening the vertical groove 7 of an arcuate shape along the dentition and the process of opening the socket 2, but the vertical groove 7 of an arcuate shape along the dentition may be opened after opening the socket 2.

Referring to FIG. 9, an example of a method of fabricating the plate denture 100 will be described. FIG. 9 is an exemplary flowchart of the method of fabricating the plate denture 100. In the example shown in FIG. 9, the fabricating method of the plate denture 100 includes steps ST1 to ST4. Step ST1 is a process executed by a computer or a control device. The computer or the control device comprises one or more processor(s) and a memory storing therein instructions executed by the single or the plurality of processors.

Step ST1 is a process of creating the denture plate 3 formed with the socket 2 and the vertical groove 7. Specifically, at step S1, the denture plate 3 is created that has the concave socket 2 formed thereon and the vertical groove 7 formed on the bottom surface of the socket 2. Step ST1 may include steps ST11 and ST12.

Step ST11 is a process of acquiring design data of the denture plate 3 formed with the socket 2 and the vertical groove 7. For example, at step ST11, design data of the denture plate 3 may be acquired by effecting the denture design (CAD) processes shown in FIG. 8. Alternatively, at step ST11, design data of the denture plate 3 already designed may be acquired by way of a network. For example, at step ST11, design data of the denture plate 3 may be acquired from a server connected via a network to the computer.

Step ST12 is a process of creating the denture plate 3, based on design data. At step ST12, the denture plate 3 is created by effecting automatic creation (P2) of the denture plate 3 in the denture fabricating (CAM) processes shown in FIG. 8. For example, at step ST12, the denture plate 3 is created based on design data by cutting using an NC machine tool or by laminate-modelling using a 3D printer.

Step ST2 is a process of applying the adhesive material 9 to the socket 2 and the vertical groove 7. The method of this process is not particularly limited but the adhesive material 9 may be applied to the socket 2 and the vertical groove 7 in accordance with the publicly-known use method of the adhesive material 9.

Step ST3 is a process of embedding the reinforcing structure 8 into the vertical groove 7 to which the adhesive material 9 is applied. For example, at step ST3, the reinforcing structure 8 is embedded into the vertical groove 7 before the adhesive material 9 cures. Step ST3 may include a step of arranging at least part of the reinforcing structure 8 apart 0.001 mm or more and 1.0 mm or less from the inner wall 7*a* defining the vertical groove 7. In the case where the protrusion 13 is disposed on the inner wall 7*a* of the vertical groove 7, part of the reinforcing structure 8 may be in contact with the protrusion 13.

Step ST4 is a process of arranging the artificial tooth 1 in the socket 2 to which the adhesive material 9 is applied. For example, at step ST4, the base 1*a* of the artificial tooth 1 is adhered to the socket 2 to which the adhesive material 9 is applied. As a result, the base 1*a* of the artificial tooth 1 is adhered to the socket 2 by the adhesive material 9.

The artificial tooth 1 may be positioned with respect to the denture plate 3 till the adhesive material 9 cures after step ST4. When the adhesive material 9 cures, the artificial tooth 1 and the reinforcing structure 8 are fixed to the denture plate 3.

By carrying out steps ST1 to ST4 above, the plate denture 100 can be fabricated. Note that the above-described fabrication method of the plate denture 100 is a mere example and is not limitative. In the fabrication method of the plate denture 100, any steps may be added, deleted, integrated, or divided.

The invention claimed is:

1. A method of fabricating a plate denture, comprising:
creating a denture plate having a concave socket formed thereon and a vertical groove formed in a bottom surface of the socket;
applying an adhesive material to the socket and the vertical groove;
embedding a reinforcing structure in the vertical groove to which the adhesive material is applied; and
arranging at least one artificial tooth in the socket to which the adhesive material is applied such that the reinforcing structure and the at least one artificial tooth are spaced apart from each other by the adhesive material and are bonded via the adhesive material.

2. The method of fabricating a plate denture of claim 1, wherein
the at least one artificial tooth includes at least six front teeth comprising left and right central incisors, lateral incisors, and canines, wherein
the vertical groove and the reinforcing structure are formed in an arcuate shape along dentition, wherein
the vertical groove and the reinforcing structure have a mesiodistal width of half or more of a mesiodistal width of molars, and wherein
the vertical groove and the reinforcing structure have a lip-lingual or buccolingual width of 1.5 mm to 15.0 mm.

3. The method of fabricating a plate denture of claim 2, wherein
the plate denture is a partial plate denture, and wherein
the reinforcing structure comprises a minor connector connected to a retainer for retaining the plate denture in a mouth of a user.

4. The method of fabricating a plate denture of claim 3, wherein
the embedding of the reinforcing structure comprises arranging at least part of the reinforcing structure at a position 0.001 mm to 1.0 mm apart from an inner wall defining the vertical groove.

5. The method of fabricating a plate denture of claim 3, wherein
the creating of the denture plate comprises:
acquiring design data of the denture plate having the socket and the vertical groove formed thereon; and
creating the denture plate, based on the design data.

6. The method of fabricating a plate denture of claim 2, wherein
The embedding of the reinforcing structure comprises arranging at least part of the reinforcing structure at a position 0.001 mm to 1.0 mm apart from an inner wall defining the vertical groove.

7. The method of fabricating a plate denture of claim 2, wherein
the creating of the denture plate comprises:
acquiring design data of the denture plate having the socket and the vertical groove formed thereon; and
creating the denture plate, based on the design data.

8. The method of fabricating a plate denture of claim 1, wherein
the plate denture is a partial plate denture, and wherein
the reinforcing structure comprises a minor connector connected to a retainer for retaining the plate denture in a mouth of a user.

9. The method of fabricating a plate denture of claim 8, wherein
the embedding of the reinforcing structure comprises arranging at least part of the reinforcing structure at a position 0.001 mm to 1.0 mm apart from an inner wall defining the vertical groove.

10. The method of fabricating a plate denture of claim 8, wherein
the creating of the denture plate comprises:
acquiring design data of the denture plate having the socket and the vertical groove formed thereon; and
creating the denture plate, based on the design data.

11. The method of fabricating a plate denture of claim 1, wherein
the embedding of the reinforcing structure comprises arranging at least part of the reinforcing structure at a position 0.001 mm to 1.0 mm apart from an inner wall defining the vertical groove.

12. The method of fabricating a plate denture of claim 1, wherein
the creating of the denture plate comprises:
acquiring design data of the denture plate having the socket and the vertical groove formed thereon; and
creating the denture plate, based on the design data.

13. A plate denture comprising:
a denture plate having a concave socket formed thereon and a vertical groove formed in a bottom surface of the socket;
an adhesive material applied to the socket and the vertical groove;
a reinforcing structure arranged in the vertical groove and embedded in the adhesive material; and
at least one artificial tooth arranged in the socket and adhered by the adhesive material such that the reinforcing structure and the at least one artificial tooth are spaced apart from each other by the adhesive material and are bonded via the adhesive material.

14. The plate denture of claim 13, wherein
the at least one artificial tooth includes at least six front teeth comprising left and right central incisors, lateral incisors, and canines, wherein
the vertical groove and the reinforcing structure are formed in an arcuate shape along dentition, wherein
the vertical groove and the reinforcing structure have a mesiodistal width of half or more of a mesiodistal width of molars, and wherein
the vertical groove and the reinforcing structure have a lip-lingual or buccolingual width of 1.5 mm to 15.0 mm.

15. The plate denture of claim 14, wherein
the plate denture is a partial plate denture, and wherein
the reinforcing structure comprises a minor connector connected to a retainer for retaining the plate denture in a mouth of a user.

16. The plate denture of claim 14, wherein
at least part of the reinforcing structure is 0.001 mm to 1.0 mm apart from an inner wall defining the vertical groove, and wherein
the adhesive material is applied to a space between at least part of the reinforcing structure and the inner wall defining the vertical groove.

17. The plate denture of claim 16, wherein
the vertical groove has on its inner wall a protrusion, the protrusion being in contact with the reinforcing structure.

18. The plate denture of claim 13, wherein
the plate denture is a partial plate denture, and wherein the reinforcing structure comprises a minor connector connected to a retainer for retaining the plate denture in a mouth of a user.

19. The plate denture of claim 18, wherein at least part of the reinforcing structure is 0.001 mm to 1.0 mm apart from an inner wall defining the vertical groove, and wherein the adhesive material is applied to a space between at least part of the reinforcing structure and the inner wall defining the vertical groove.

20. The plate denture of claim 19, wherein the vertical groove has on its inner wall a protrusion, the protrusion being in contact with the reinforcing structure.

21. The plate denture of claim 13, wherein at least part of the reinforcing structure is 0.001 mm to 1.0 mm apart from an inner wall defining the vertical groove, and wherein the adhesive material is applied to a space between at least part of the reinforcing structure and the inner wall defining the vertical groove.

22. The plate denture of claim 21, wherein the vertical groove has on its inner wall a protrusion, the protrusion being in contact with the reinforcing structure.

* * * * *